United States Patent [19]

Baumeister

[11] Patent Number: 4,764,823
[45] Date of Patent: Aug. 16, 1988

[54] SOFT ERASE PROTECTION FOR VIDEO CASSETTES

[75] Inventor: Hans-Peter Baumeister, Churchville, N.Y.

[73] Assignee: Eastman Kodak Company, Rochester, N.Y.

[21] Appl. No.: 940,896

[22] Filed: Dec. 12, 1986

[51] Int. Cl.$^4$ .................. G11B 15/04; G11B 15/18
[52] U.S. Cl. .................................. 360/60; 360/72.1
[58] Field of Search .......................... 360/60, 72.1

[56] References Cited

U.S. PATENT DOCUMENTS

| | | | |
|---|---|---|---|
| 4,005,481 | 1/1977 | Lackner | 360/60 |
| 4,214,280 | 7/1980 | Halfhill et al. | 360/53 |
| 4,249,041 | 2/1981 | Smith, Jr. et al. | 369/28 |
| 4,418,367 | 11/1983 | Nagai et al. | 360/72.1 |

FOREIGN PATENT DOCUMENTS

| | | | |
|---|---|---|---|
| 0064918 | 5/1977 | Japan | 360/60 |
| 0048514 | 4/1979 | Japan | 360/60 |
| 0253002 | 12/1985 | Japan | 360/60 |

*Primary Examiner*—Raymond F. Cardillo
*Assistant Examiner*—Surinder Sachar
*Attorney, Agent, or Firm*—Robert M. Wallace

[57] ABSTRACT

A video cassette recorder (VCR) erase protection system which is responsive to the standard anti-erase switch on a video cassette, is capable of "filling-in" unused portions of an erase-protected video cassette without disturbing previously recorded material on the cassette and without requiring the user to turn off the anti-erase switch on the cassette. By eliminating the need to turn off the anti-erase switch before recording additional material, the possibility of forgetting to later rearm the switch is eliminated. A microprocessor, responding to the anti-erase switch position and to the video signal sensed during an initial fast winding of the tape, intelligently positions the tape prior to recording so that recording takes place in unused tape portions only, without requiring any further action by the user. The microprocessor commands the video cassette recorder to fast wind the tape past previously recorded material, before permitting the recording operation to begin, whenever it senses that the cassette has an anti-erase switch in the ON position.

3 Claims, 3 Drawing Sheets

SOFT ERASE PROTECTION FOR VIDEO CASSETTES

BACKGROUND OF THE INVENTION

1. Technical Field

The invention is related to video cassette recorders and video cassettes having a feature, now standard in the industry, of an anti-erase switch comprising (in the case of 8 mm video cassettes) a mechanical slide near a particular corner of the cassette housing. VHS cassettes have a break-away tab, instead of a slide switch. Whenever, the anti-erase switch is in the "ON" position, the video cassette recorder prevents itself from recording on the video cassette, thus insuring preservation of any material previously recorded on the cassette.

2. Description of the Problem

The problem is how to record on a video cassette having previously recorded material thereon, which must not be erased, without risking erasure of the previously recorded material. For anyone familiar with home video cassette recording systems, erase protection for recorded programs such as irreplaceable scenes from family history, etc., is an essential feature. However, in order to protect a video cassette storing such valuable material, the standard anti-erase switch must be moved to the "ON" position, which makes that cassette useless for any further recording, even though it is likely that when such protection is first required, a large portion of the cassette remains unused. The problem is that the user will later attempt to record in unused portions of the cassette and therefore must deactivate the anti-erase switch. This creates two problems. First, the user is likely to forget to reset the anti-erase switch when finished. Secondly, it is highly inconvenient to search through a two-hour video cassette (for example) for that portion of video tape which remains unused.

SUMMARY OF THE INVENTION

Solution to the Problem

In the invention, the necessity of deactivating the anti-erase switch in order to record in unused portions of a video cassette is eliminated. Furthermore, the necessity of trial and error searching through the video cassette tape for unused tape portions prior to recording is also eliminated. The response to an activated anti-erase switch on the tape cassette, rather than being a "dumb" wholesale prevention of any recording whatsoever, is controlled by an intelligent device such as a microprocessor responsive to programmed instructions stored in a read only memory, for example. If the anti-erase switch is in the "ON" (i.e., anti-erase) position, the microprocessor causes the VCR to fast wind the cassette tape. During fast wind operation, although the tape tension may be loosened around the head drum, the heads continue to sense the presence of the video signal, or at least the tracking pilot signals (for example) recorded with any video signals on the tape. The microprocessor monitors the response of the heads to the video or tracking pilot signals, and notices when the heads no longer sense the presence of such signals, signifying that the tape has been wound to the beginning of an unused portion. The microprocessor commands the video cassette recorder to stop the fast wind operation and to begin the record operation at that point. Thus, the previously recorded material is preserved while permitting the user to use the cassette for later recording purposes without requiring the anti-erase switch to be turned off. in one sense, the anti-erase switch has been intelligently bypassed.

Such a feature promises a revolution in the manner in which video cassettes are used. It is anticipated that, with this invention, most users would simply move the anti-erase switch on all of their cassettes to the "ON" position so that no recorded material will ever be erased without the user taking positive steps (i.e., deactivating the anti-erase switch on a particular cassette).

BRIEF DESCRIPTION OF THE DRAWINGS

The invention may be understood by reference to the accompanying drawings, of which.

DETAILED DESCRIPTION OF THE PREFERRED EMBODIMENT

Figure 1:
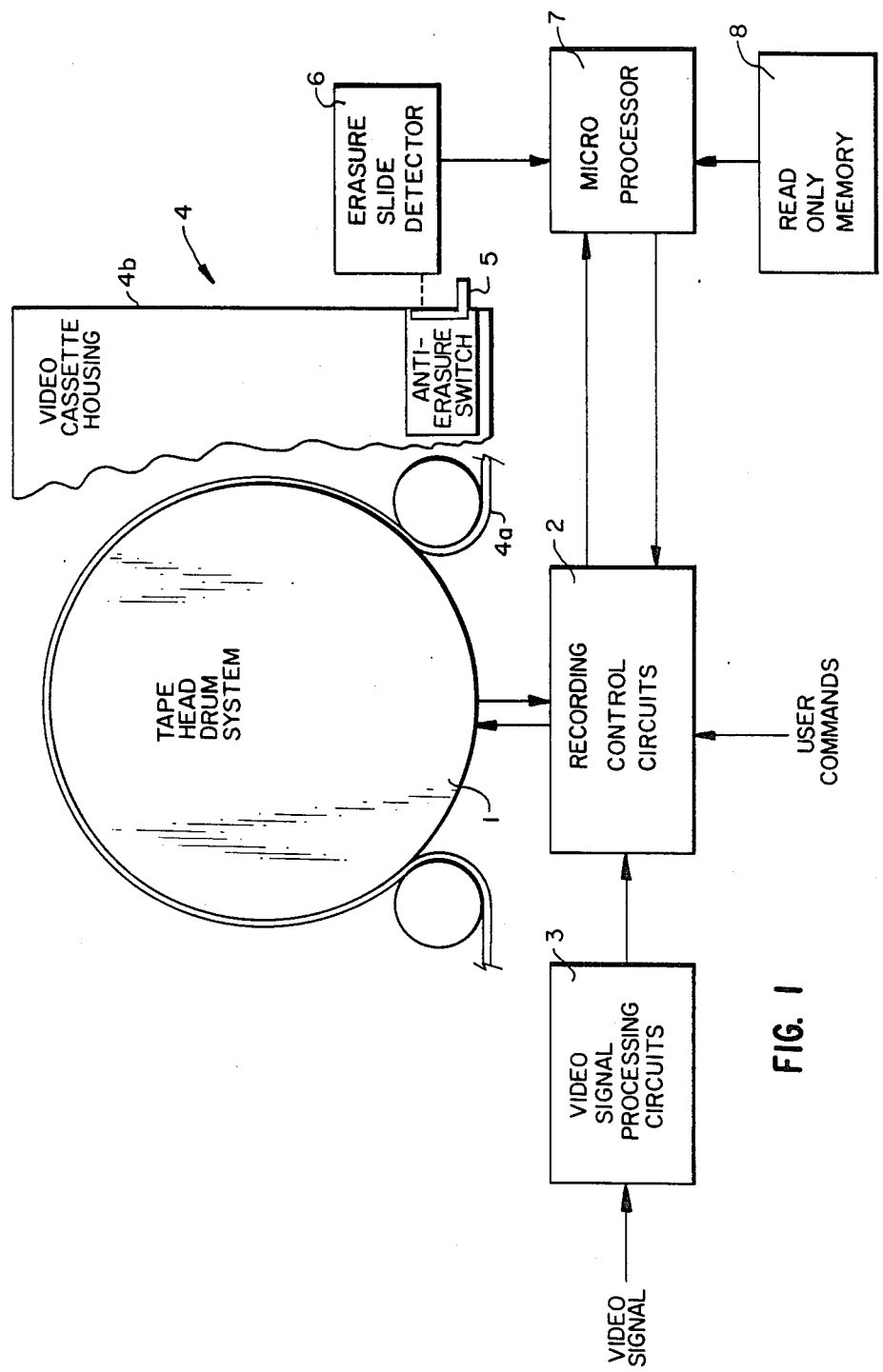
FIG. 1 illustrates apparatus embodying the invention.

Referring to FIG. 1, a VCR includes a helical scan tape-head-drum system 1 of the type well-known in the art, comprising a rotary drum, a pair of magnetic heads and a tape transport mechanism. The tape-head-drum system 1 is connected to recording control circuits 2 and video signal processing circuits 3. The VCR is adapted to receive a video cassette 4 including a video tape 4a and a cassette housing 4b having an anti-erase slide switch 5 disposed near one corner thereof in accordance with the industry standard. The VCR detects the position of the anti-erase switch 5 through a mechanical slide detector 6, which is typical of industry standard VCR's.

A microprocessor 7 receives information from the recording control circuits 2 and transmits commands to the recording control circuits 2. The slide detector 6 transmits information to the microprocessor 7. The microprocessor 7 controls the recording control circuits in response to commands received from the VCR user and in response to the output of the slide detector 6 by executing instructions stored in a read only memory 8. Execution by the microprocessor 7 of the stored instructions is illustrated in the diagram of FIG. 2.

Figure 2:
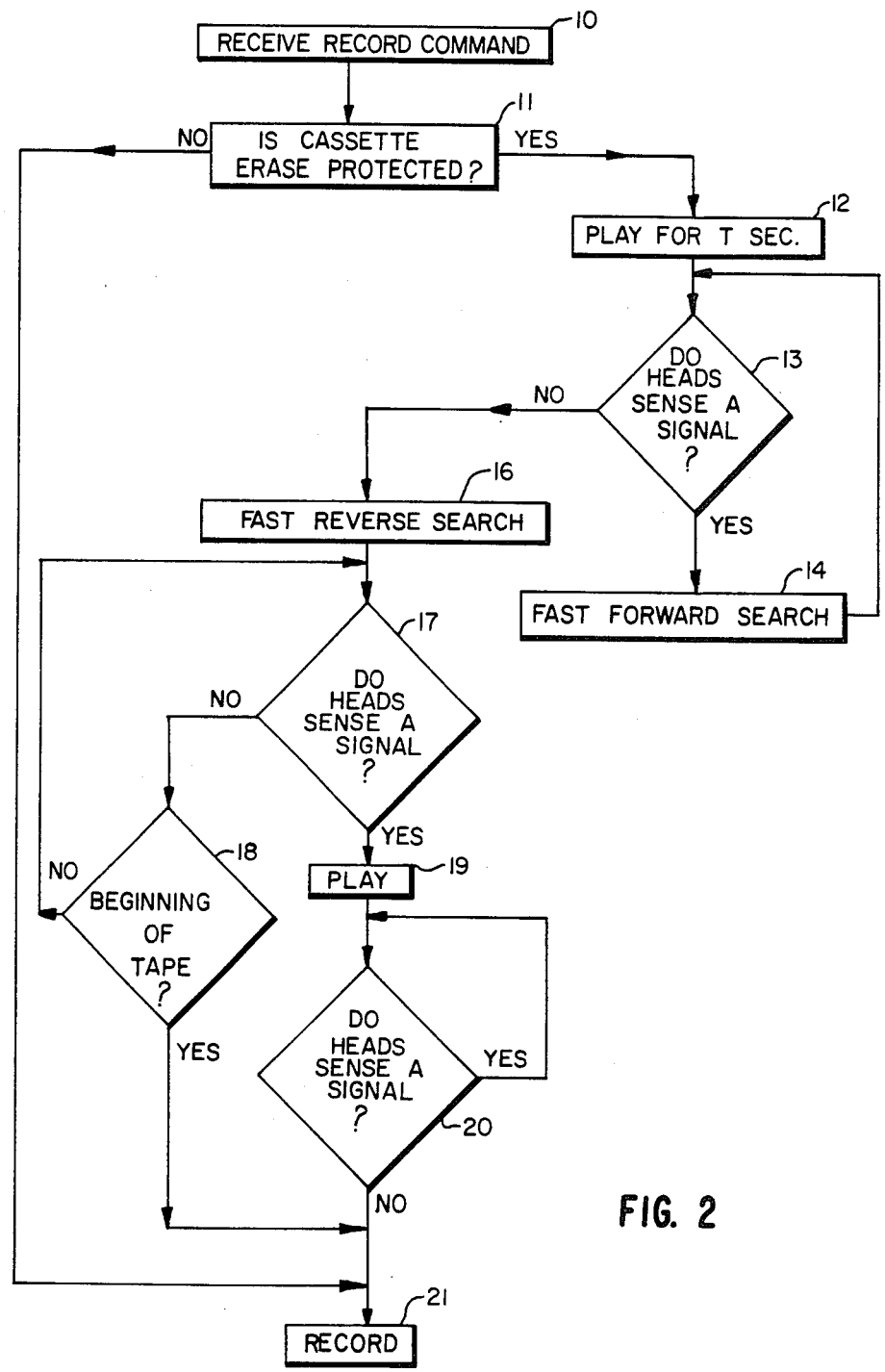
FIG. 2 illustrates the operation of a microprocessor included in the apparatus of FIG. 1.
Figure 3A:
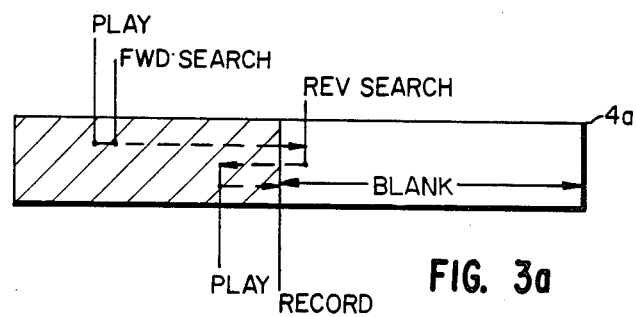
FIG. 3a–3c illustrates recording on an erase protected video cassette in accordance with the invention.

Referring to FIG. 2, the VCR of FIG. 1 receives a record command from the user (block 10 of FIG. 2). At this point, the microprocessor 7 determines whether the position of the anti-erase switch 5 indicates anti-erase protection (block 11). If the erase slide detector 6 indicates that the anti-erase switch 5 is in the "ON" position, the microprocessor 7 (taking the "YES" branch of block 11) commands the recording control circuits 2 to play the cassette tape 4a for a short period T of several seconds (block 12). (The period T is selected to be greater than the longest anticipated gap on the tape between successive recordings which, using the VCR of the present invention, is only several seconds.) The microprocessor 7 monitors the response of the heads and inquires whether the heads detect a video (or tracking pilot) signal (block 13). If such a signal is sensed (as in the example illustrated in FIG. 3a), the microprocessor 7 (taking the "YES" branch of block 13) issues a fast forward search command (block 14). The fast forward search command may cause the tape tension around the drum mechanism to lessen somewhat, although the heads continue to sense the previously recorded video signal or at least the accompanying tracking pilot signal.

Once the heads no longer sense the presence of a video (or tracking pilot) signal—signifying that an unused portion of the tape has been found (see FIG. 3a)—the microprocessor (taking the "NO" branch of block 13) delays for a few seconds and then stops the fast forward search operation and begins a fast reverse search operation (block 16). (The delay of a few seconds is a precautionary measure in case there is a long gap between previous recordings.) During the reverse search operation, the microprocessor 7 constantly inquires whether heads detect a video signal (block 17). (Initially, the heads will not detect a video signal at this point because the fast forward operation will have "over-shot" the boundary between the previously used and presently unused portions of the video tape, by virtue of the delay discussed above.) Taking the "NO" branch of block 17, the microprocessor 7 then makes sure that the tape has not yet been rewound to the beginning (block 18) and the reverse search operation continues ("NO" branch of block 18). Once the tape has finally been rewound past the boundary between the used and unused portions of the tape, the heads detect a video signal and the microprocessor 7 (taking the "YES" branch of block 17) issues a play (forward) command (block 19) in order to precisely position the tape at the boundary between the used and unused tape portions. As soon as this boundary is reached, the heads detect no video signal ("NO" branch of block 20) and recording may now begin (block 21).

If a VCR not embodying the present invention has been used to record on the cassette, it is possible that the previously recorded material begins near the middle of the cassette, and will therefore not be detected during the brief play operation of block 12. Therefore, the system of FIG. 1 is not best suited for protecting from erasure material previously recorded on the cassette by such a VCR. In order to solve this problem, the anti-erase switch 5, previously described as having just two states ("ON" and "OFF") may have a third state ("absolute"). The VCR of FIG. 1 prevents any recording on the cassette whatsoever the anti-erase switch 5 is in its third ("absolute") position, as sensed by the slide detector 6. This protects material previously recorded on the cassette by a VCR not embodying the present invention.

Figure 3B:
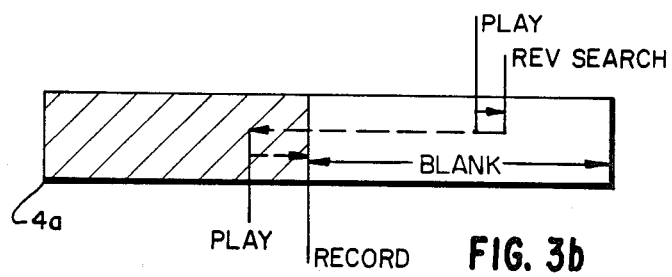

In another example (illustrated in FIG. 3b), operation may begin (at block 10 of FIG. 2) at a time when the tape has been wound to a position well past a previously recorded video program. It would be desirable to rewind the tape so that the next recording operation begins at the end of the previously recorded program on the tape. In this case, operation begins when the microprocessor 7 takes the "YES" branch of block 11 and initiates the play operation of block 12 for the duration of the interval T. Of course, the heads sense no video signal, so that the microprocessor 7 takes the "NO" branch of block 13 to begin the fast reverse search operation of block 16. No video signal is detected at first, so that the microprocessor 7 takes the "NO" branch of block 17 to block 18. Since the tape has not been rewound to its beginning, the microprocessor 7 takes the "NO" branch of block 18 back to block 17, and the fast reverse search operation continues. When the tape has finally been wound to the end of the previously recorded video program, the microprocessor 7 takes the "YES" branch of block 17. (Operation from this point on is as described previously.)

Figure 3C:
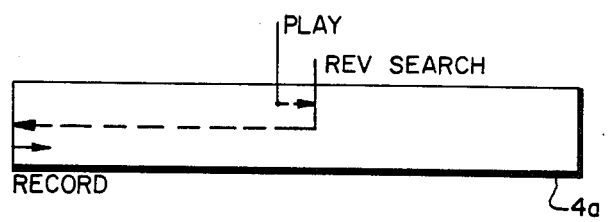

As yet another example (illustrated in FIG. 3c), if no video program has been previously recorded on the tape, the rewind operation of block 21 continues all the way to the beginning of the tape. In this case, the microprocessor 7 (taking the "YES" branch of block 18) begins the recording operation of block 19 at the beginning of the tape.

If the VCR and tape are a VHS system, the video or tracking signal presence may be detected by using a stationary head not located on the rotary drum. If the recorded signal comprises multichannel audio signals on several adjacent "PCM" tracks (as in the Kodak MVS 5000 8 mm Audio Video Recorder), then the sensing of the presence of previously recorded signals occurs only in a selected one of the PCM tracks.

While the invention has been described in detail with particular reference to a presently preferred embodiment thereof, it is understood that variations and modifications may be made within the spirit and scope of the invention.

What is claimed is:

1. In a recorder adapted to receive a magnetic tape housed in a cassette having external mechanical means mounted thereon for indicating whether material previously recorded on said tape is to be protected against erasure, said recorder having tape transport means and means including magnetic heads for recording signals onto, and playing back signals from, said video tape, an intelligent erase-protection system, comprising:
    anti-erase detection means for generating a signal representative of the state of said indicating means whenever said cassette is received by said recorder; and
    processing means adapted, whenever said detection means senses that said indicating means is in an activated state, for:
    (a) sensing the output of said heads,
    (b) commanding said tape transport means to fast wind said tape as long as said heads detect at lease an indicia of the presence of a previously recorded signal on said tape; and
    (c) issuing a command to said transport means to stop fast winding whenever said heads cease detecting said signal presence, whereby said recorder may begin recording on said tape even though said indicating means remains activated, without accidentally erasing any prerecorded information on said cassette tape, and whereby said unused portions of said tape are automatically located by said processing means during each subsequent recording step.

2. The video cassette recorder of claim 1, wherein said processing means is further adapted, whenever said detection means senses that said indicating means is activated, for:
    (a) playing said tape for a specified period while determining whether said heads detect a previously recorded signal,
    (b) stopping said playing of said tape whenever a previously recorded signal is not detected during said specified period, and winding said tape in an opposite direction,
    (c) determining whether said heads detect the presence of a previously recorded signal during said opposite direction winding; and
    (d) stopping said opposite direction winding whenever said heads detect said signal presence or whenever the beginning of said tape is reached.

3. The video cassette recorder of claim 1, wherein said tape transporting means is characterized by a slight delay between a time when said microprocessor issues said stop winding command and a time when said tape transporting means actually stops said fast winding of said tape, and wherein said processing means is further adapted to compensate for said delay by:
 (a) initiating a play operation in the opposite direction of said fast winding following said issuing of said stop command,
 (b) sensing whether said heads detect the presence of a signal; and
 (c) stopping said play operation whenever said heads no longer detect the presence of a signal, whereby each subsequent recording operation is begun at a location virtually precisely at the boundary on said tape between a previously recorded portion and a presently unused portion of said tape, whereby the amount of unused tape between successive recordings is minimized.

* * * * *